(12) United States Patent
Son et al.

(10) Patent No.: US 12,443,239 B2
(45) Date of Patent: Oct. 14, 2025

(54) CIRCUIT BOARD AND DISPLAY DEVICE INCLUDING THE SAME

(71) Applicant: Samsung Display Co., LTD., Yongin-si (KR)

(72) Inventors: Jiwoo Son, Yongin-si (KR); Seunghwa Ha, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 25 days.

(21) Appl. No.: 18/354,739

(22) Filed: Jul. 19, 2023

(65) Prior Publication Data

US 2024/0201741 A1 Jun. 20, 2024

(30) Foreign Application Priority Data

Dec. 15, 2022 (KR) ........................ 10-2022-0176078

(51) Int. Cl.
*G06F 1/16* (2006.01)
*H05K 1/02* (2006.01)

(52) U.S. Cl.
CPC .......... *G06F 1/1652* (2013.01); *G06F 1/1641* (2013.01); *H05K 1/028* (2013.01)

(58) Field of Classification Search
CPC .... G06F 1/1652; G06F 1/1641; G06F 1/1618; G06F 2203/04102; H05K 1/028; H05K 2201/05; H10K 77/111; H10K 59/131; H10K 2102/311; G09F 9/301; H04M 1/0216
See application file for complete search history.

(56) References Cited

U.S. PATENT DOCUMENTS

| | | | | |
|---|---|---|---|---|
| 7,746,439 B2* | 6/2010 | Kohno | .................... | H05K 1/028 |
| | | | | 349/158 |
| 9,713,256 B2* | 7/2017 | Jeon | ...................... | H05K 1/0281 |
| 9,801,278 B2* | 10/2017 | Lee | ......................... | H05K 1/147 |
| 9,812,800 B2* | 11/2017 | Lee | ...................... | H01R 12/771 |
| 9,829,924 B2* | 11/2017 | Shin | ...................... | G06F 1/1656 |
| 10,091,880 B2* | 10/2018 | Nam | .................... | H05K 1/0278 |
| 10,345,856 B2* | 7/2019 | Song | ...................... | H05K 1/028 |
| 10,636,858 B2* | 4/2020 | Nishinohara | ...... | H10K 59/1216 |
| 11,089,700 B2* | 8/2021 | Kang | ....................... | H05K 1/18 |
| 11,252,819 B2* | 2/2022 | Iwai | ....................... | H05K 1/147 |
| 11,314,367 B2* | 4/2022 | Jung | .................... | H10K 50/844 |
| 11,412,614 B2* | 8/2022 | Ha | ....................... | H01L 23/4985 |
| 11,455,913 B2* | 9/2022 | Kwon | ................... | H10K 59/873 |
| 11,723,162 B2* | 8/2023 | Jin | ........................ | H10K 77/111 |
| | | | | 361/807 |
| 11,729,913 B2* | 8/2023 | Ha | ......................... | H05K 1/147 |
| | | | | 361/749 |
| 11,968,861 B2* | 4/2024 | Ichikawa | ................ | H05B 33/10 |
| 12,133,341 B2* | 10/2024 | Wang | ........................ | G09F 9/30 |
| 2011/0176260 A1* | 7/2011 | Walters | ............... | H04M 1/0268 |
| | | | | 361/679.01 |

(Continued)

FOREIGN PATENT DOCUMENTS

KR 10-2045403 11/2019

*Primary Examiner* — Rockshana D Chowdhury
(74) *Attorney, Agent, or Firm* — Sughrue Mion, PLLC

(57) ABSTRACT

A circuit board includes a base substrate including a first portion extending in a first direction and including a plurality of holes, and a second portion extending from the first portion in a second direction intersecting the first direction.

20 Claims, 11 Drawing Sheets

(56) References Cited

U.S. PATENT DOCUMENTS

| | | | | |
|---|---|---|---|---|
| 2016/0165726 A1* | 6/2016 | Lee | ........................ | H05K 1/147 |
| | | | | 361/783 |
| 2016/0205786 A1* | 7/2016 | Nam | .................... | H05K 1/0278 |
| | | | | 29/830 |
| 2017/0062485 A1* | 3/2017 | Kwon | ................ | H10D 86/0212 |
| 2017/0139249 A1* | 5/2017 | Moon | ...................... | H04N 5/44 |
| 2017/0162821 A1* | 6/2017 | Oh | ........................ | H05K 1/028 |
| 2017/0371376 A1* | 12/2017 | Chung | .................. | H05K 1/028 |
| 2018/0097197 A1* | 4/2018 | Han | ...................... | G06F 1/1626 |
| 2018/0098427 A1* | 4/2018 | Park | ...................... | H05K 1/147 |
| 2020/0029437 A1* | 1/2020 | Jin | ........................ | H05K 1/028 |
| 2020/0042042 A1* | 2/2020 | Park | ...................... | G06F 1/1681 |
| 2021/0026412 A1* | 1/2021 | Lee | ........................ | H05K 1/028 |
| 2021/0166590 A1* | 6/2021 | Jung | .................... | G06F 1/1652 |
| 2021/0209971 A1* | 7/2021 | Chu | ........................ | G06F 1/181 |
| 2021/0223823 A1* | 7/2021 | Chen | .................... | G06F 1/1652 |
| 2021/0358346 A1* | 11/2021 | Suga | ...................... | H05B 33/06 |
| 2022/0035411 A1* | 2/2022 | Abe | ...................... | G02F 1/1345 |
| 2022/0158145 A1* | 5/2022 | Yamaguchi | .......... | H10K 59/131 |
| 2022/0279667 A1* | 9/2022 | Lee | ...................... | G06F 1/1624 |
| 2022/0291720 A1* | 9/2022 | Luo | ...................... | G06F 1/1683 |
| 2023/0152864 A1* | 5/2023 | Wang | .................... | G06F 1/1683 |
| | | | | 361/679.01 |
| 2023/0384825 A1* | 11/2023 | Connor | ................ | G04G 17/083 |

\* cited by examiner

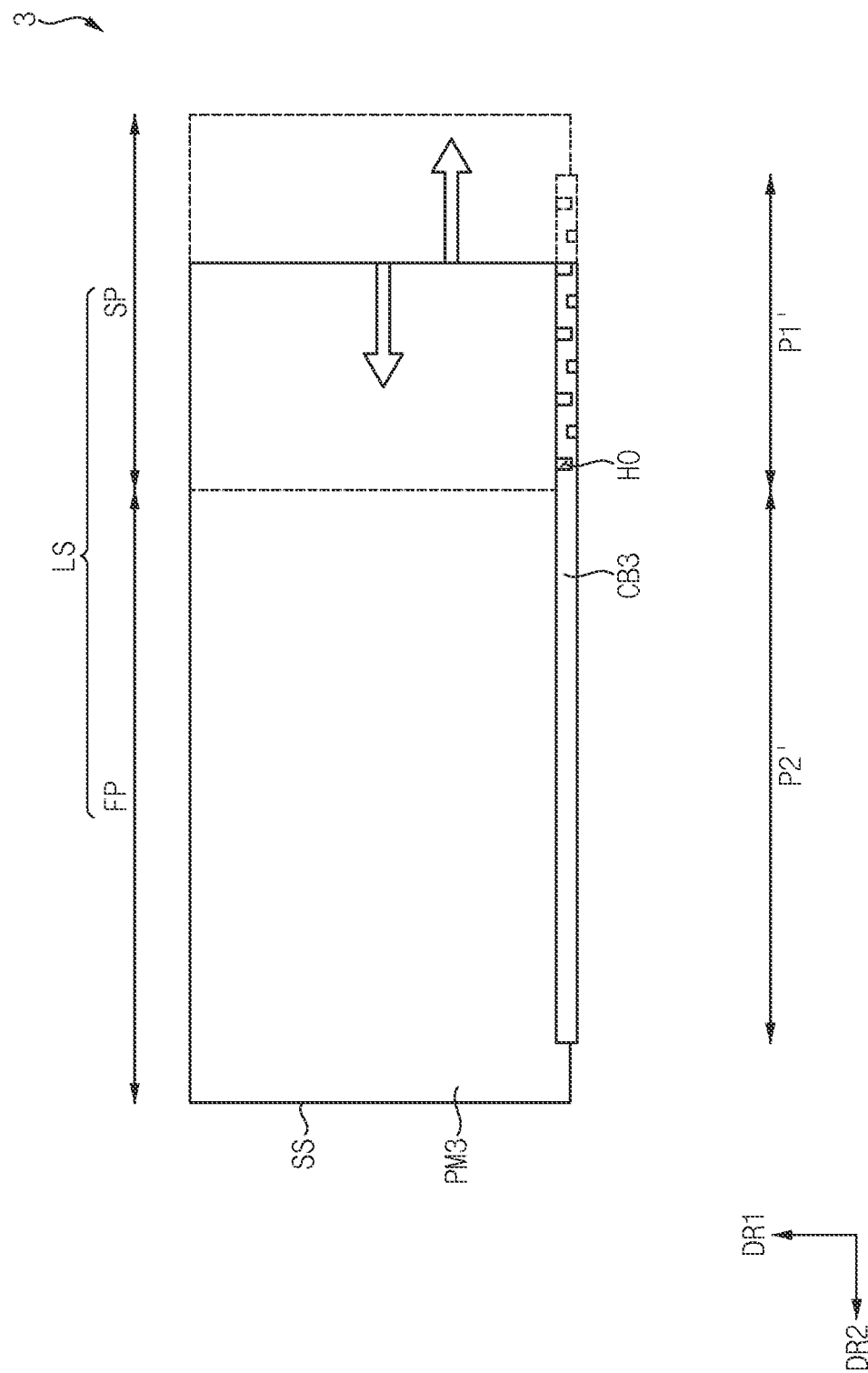

CIRCUIT BOARD AND DISPLAY DEVICE INCLUDING THE SAME

CROSS-REFERENCE TO RELATED APPLICATION(S)

This application claims priority to and benefits of Korean Patent Application No. 10-2022-0176078 under 35 USC § 119, filed on Dec. 15, 2022, in the Korean Intellectual Property Office (KIPO), the entire contents of which are incorporated herein by reference.

BACKGROUND

1. Technical Field

Embodiments relate to a circuit board and a display device including the circuit board.

2. Description of the Related Art

As information technology develops, the importance of display devices, which are a primary communication media between users and information, is being heightened. Accordingly, the use of display devices, such as liquid crystal display devices, organic light emitting display devices, plasma display devices, and the like, is increasing.

By bending at least a portion of the display device, visibility at various angles is increased or an area of a non-display area is reduced. Such a display device includes a display module with a bendable portion and a flexible property.

SUMMARY

The disclosure may provide a circuit board.

The disclosure may provide a display device including the circuit board.

The circuit board according to an embodiment of the disclosure may include a base substrate including a first portion extending in a first direction and including a plurality of holes, and a second portion extending from the first portion in a second direction intersecting the first direction.

In an embodiment, the base substrate may further include a third portion extending from the first portion in an opposite direction of the second direction.

In an embodiment, the first portion may be foldable with respect to a folding axis extending in the first direction.

In an embodiment, the circuit board may further include a plurality of lines disposed in the first portion on the base substrate. Each of the plurality of lines may be spaced apart from the plurality of holes in a plan view.

In an embodiment, a thickness of each of the plurality of lines may be less than a minimum gap between adjacent ones of the pluralities of holes.

In an embodiment, the plurality of lines may contact each other at a plurality of intersection points.

A display device according to an embodiment of the disclosure may include a display module including a first folding area extending in a first direction, a first non-folding area extending from the first folding area in a second direction intersecting the first direction, and a second non-folding area extending from the first folding area in an opposite direction of the second direction, and a circuit board electrically connected to the display module and including a base substrate including a first portion extending in the first direction and including a plurality of holes, a second portion extending from the first portion in the second direction, and a third portion extending from the first portion in the opposite direction of the second direction.

In an embodiment, the first portion of the base substrate may overlap the first folding area of the display module in a thickness direction of the base substrate.

In an embodiment, the first portion of the base substrate may be foldable with respect to a folding axis extending in the first direction.

In an embodiment, the circuit board may further include a plurality of lines disposed in the first portion on the base substrate. Each of the plurality of lines may be spaced apart from the plurality of holes in a plan view.

In an embodiment, a thickness of each of the plurality of lines may be less than a minimum gap between adjacent ones of the pluralities of holes.

In an embodiment, the plurality of lines may contact each other at a plurality of intersection points.

In an embodiment, in a plan view, the display module may have a short side parallel to the first direction and a long side intersecting the short side, and the circuit board may be disposed adjacent to the long side of the display module.

In an embodiment, the display module may further include a second folding area spaced apart from the first folding area and disposed adjacent to the first non-folding area. The circuit board may further include a fourth portion spaced apart from the first portion and disposed adjacent to the third portion. The second folding area of the display module and the fourth portion of the circuit board may overlap with each other in a thickness direction of the base substrate.

A display device according to an embodiment of the disclosure may include a display module including a fixed portion and a sliding portion extending in a direction from the fixed portion and rollable as the display module slides, and a circuit board electrically connected to the display module and including a base substrate including a first portion extending in a first direction and including a plurality of holes, and a second portion extending from the first portion in a second direction intersecting the first direction.

In an embodiment, the first portion of the base substrate may overlap the sliding portion of the display module in a thickness direction of the base substrate.

In an embodiment, the circuit board may further include a plurality of lines disposed in the first portion on the base substrate. Each of the plurality of lines may be spaced apart from the plurality of holes in a plan view.

In an embodiment, a thickness of each of the plurality of lines may be less than a minimum gap between adjacent ones of the pluralities of holes.

In an embodiment, the plurality of lines may contact each other at a plurality of intersection points.

In an embodiment, in a plan view, the display module may have a short side parallel to the first direction and a long side intersecting the short side, and the circuit board may be disposed adjacent to the long side of the display module.

The circuit board according to embodiments of the disclosure may include a base substrate in which a plurality of holes is defined in a first portion. Accordingly, the circuit board may be bent.

The circuit board may further include a plurality of lines disposed in the first portion on the base substrate. The plurality of lines may be spaced apart from the plurality of the holes in a plan view. A thickness of each of the plurality of lines may be less than a minimum gap between adjacent ones of the pluralities of holes. Accordingly, disconnection of the plurality of the lines due to the plurality of the holes may be prevented.

The base substrate may include a first portion and a second portion, and a plurality of holes may be defined in the first portion. The first portion may extend in a first direction and the second portion may extend from the first portion toward a second direction intersecting the first direction.

The display device according to embodiments of the disclosure may include a circuit board. Accordingly, as the display device is bent, the circuit board may also be bent.

The display device may further include a display module that may be foldable with respect to a folding axis extending in the first direction. The circuit board included in the display device may be electrically connected to a long side of the display module. Accordingly, the display device according to embodiments of the disclosure may be driven at a higher speed than a display device including the circuit board connected to a short side of the display device.

BRIEF DESCRIPTION OF THE DRAWINGS

FIGS. 9, 10, and 11 are views illustrating a display device including the circuit board of FIG. 8.

DETAILED DESCRIPTION OF THE EMBODIMENTS

Figure 1:
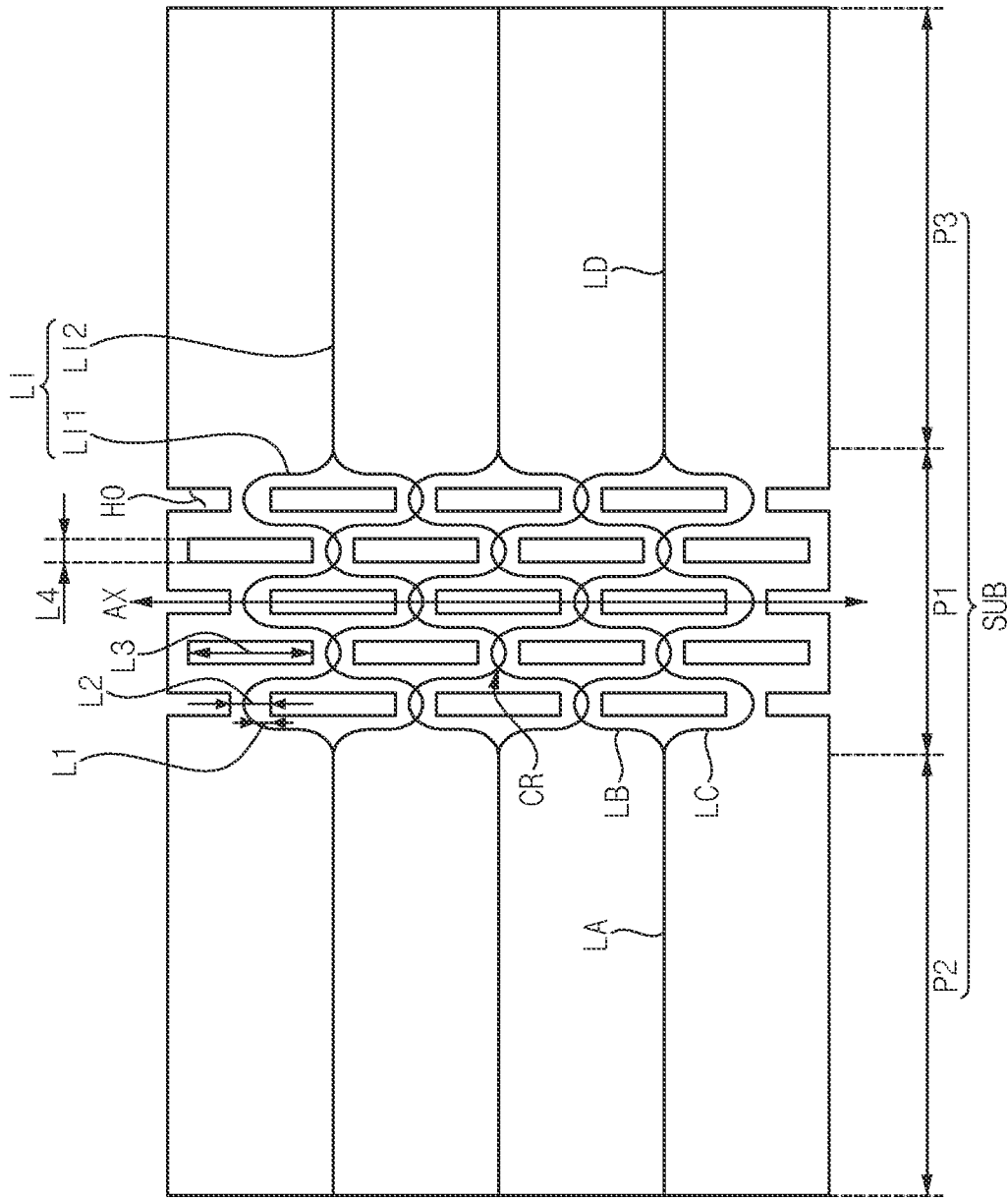
FIG. 1 is a plan view illustrating a circuit board according to an embodiment of the disclosure.

Hereinafter, display devices in accordance with embodiments will be described in more detail with reference to the accompanying drawings. The same reference numerals are used for the same components in the drawings, and redundant descriptions of the same components will be omitted.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Also, when an element is referred to as being "in contact" or "contacted" or the like to another element, the element may be in "electrical contact" or in "physical contact" with another element; or in "indirect contact" or in "direct contact" with another element.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a plan view illustrating a circuit board CB1 according to an embodiment of the disclosure.

Referring to FIG. 1, the circuit board CB1 according to an embodiment of the disclosure may include a base substrate SUB and multiple lines LI.

In an embodiment, the base substrate SUB may include a first portion P1, a second portion P2, and a third portion P3. The first portion P1 may extend in a first direction DR1. The second portion P2 may extend from the first portion P1 in a second direction DR2 intersecting the first direction DR1. The third portion P3 may extend from the first portion P1 in an opposite direction of the second direction DR2.

In an embodiment, multiple holes HO may be defined in the first portion P1 on the base substrate SUB. For example, as the holes HO are defined in the first portion P1 on the base substrate SUB, the first portion P1 of the base substrate SUB may be foldable with respect to a folding axis AX extending in the first direction DR1.

The holes HO defined in the first portion P1 on the base substrate SUB may have a same size in a plan view. For example, each of the holes HO may have a first length L3 in the first direction DR1 and may have a second length L4 in the second direction DR2.

The lines LI may be disposed on the base substrate SUB. The lines LI may be spaced apart from the holes HO defined in the first portion P1 on the base substrate SUB in a plan view. A plane may be defined by the first direction DR1 and the second direction DR2.

The lines LI may include a line LI1 positioned in the first portion P1 and a line LI2 positioned in the second and the third portions P2 and P3 on the base substrate SUB. A width (or thickness) L1 of the line LI1 positioned in the first portion P1 and a width of the line LI2 positioned in the second and third portions P2 and P3 may be different from each other. For convenience of description, hereinafter, the line LI1 positioned in the first portion P1 and the line LI2 positioned in the second portion P2 will be described.

In an embodiment, the width L1 of the line LI1 positioned in the first portion P1 on the base substrate SUB may be less than a minimum gap L2 between adjacent holes HO. For example, the holes HO may be defined in the first portion P1 on the base substrate SUB to have a first gap in the first direction DR1. The holes HO may be defined in the first portion P1 on the base substrate SUB to have a second gap in the second direction DR2. The first gap and the second gap may be same. In another embodiment, the first gap may be greater than the second gap, or the second gap may be greater than the first gap.

The width L1 of the line LI1 positioned in the first portion P1 on the base substrate SUB may be less than the minimum gap L2 among the gaps between adjacent holes HO. Accordingly, disconnection of the line LI1 due to the holes HO may be prevented. However, the disclosure is not limited thereto, and the line LI1 positioned in the first portion P1 and the line LI2 positioned in the second portion P2 on the base substrate SUB may have a same width.

The line LI1 positioned in the first portion P1 and the line LI2 positioned in the second portion P2 on the base substrate SUB may have different shapes in a plan view.

In an embodiment, the line LI1 positioned in the first portion P1 on the base substrate SUB may contact each other at multiple intersection points CR. For example, at a boundary between the first portion P1 and the second portion P2 on the base substrate SUB, the line LI2 positioned in the second portion P2 may be branched. Branched lines may have a spider web shape in the first portion P1 on the base substrate SUB. In other words, the branched lines may cross each other and may contact each other at the intersection points CR. The branched lines positioned in the first portion P1 on the base substrate SUB may be combined again in the third portion P3.

The line LI1 positioned in the first portion P1 on the base substrate SUB may be disposed to contact each other at the intersection points CR, so that in case that the first portion P1 is folded, the disconnection of the line LI1 positioned in the first portion P1 may be prevented.

For example, a first line LA positioned in the second portion P2 on the base substrate SUB may be branched into a second line LB and a third line LC in the first portion P1 on the base substrate SUB. The second line LB and the third line LC may be combined into a fourth line LD positioned in the third portion P3.

The second line LB and the third line LC positioned in the first portion P1 on the base substrate SUB may be disposed in the spider web shape in a plan view. In other words, the second line LB and the third line LC may cross each other. Accordingly, the second line LB and the third line LC may contact each other at the intersection points CR.

The second line LB and the third line LC positioned in the first portion P1 on the base substrate SUB may have the intersection points CR. Accordingly, even in case that the second line LB is disconnected, a signal input to the first line LA may be transmitted to the fourth line LD through the third line LC. Conversely, even in case that the third line LC is disconnected, the signal input to the first line LA may be transmitted to the fourth line LD through the second line LB. However, the disclosure is not limited thereto, and the line LI1 positioned in the first portion P1 on the base substrate SUB may be arranged to prevent disconnection in case that the first portion P1 is folded.

In FIG. 1, each of the holes HO may have the first length L3 in the first direction DR1 and the second length L4 in the second direction DR2, and the minimum gap L2 between the holes HO may be greater than the width L1 of the line LI1 positioned in the first portion P1.

However, a size of the first portion P1, the number and size of the holes HO defined in the first portion P1, the minimum gap L2 between the holes HO, and the like may be freely modified as needed. For example, a circuit board included in a slidable display device may require a greater curvature than a circuit board included in a foldable display device. Therefore, the minimum gap L2 between the holes HO defined in the first portion P1 on the base substrate SUB included in the slidable display device may be greater than the minimum gap L2 between the holes HO defined in the first portion P1 on the base substrate SUB included in the foldable display device.

The circuit board CB1 according to an embodiment of the disclosure may define the holes HO after forming of the lines LI on the base substrate SUB.

In an embodiment, the holes HO defined in the circuit board CB1 may be defined through a dry etching process. For example, a mask may be placed on a region to be protected on the circuit board CB1, and the dry etching process may be performed on a region to be removed (e.g., positions of the holes HO). Plasma gas that does not react with the region to be protected may be used.

In another embodiment, the holes HO formed on the circuit board CB1 may be formed through a sand blast process. For example, a film may be attached to the region to be protected on the circuit board CB1, and grains of sand may be sprayed to the region to be removed (e.g., positions of the holes HO). The sand grains may be blown at high speed by compressed air. The film may have a patterned shape by covering a region other than the hole. An injection pressure of the compressed air, a size of the grain of sand, and a material included in the film may be variously changed.

In another embodiment, the holes HO formed on the circuit board CB1 may be formed through a laser drilling process. For example, a laser may be irradiated to the region to be removed (e.g., the positions of the holes HO) from the circuit board CB1. The laser may minimize deformation of the circuit board CB1 by forming the holes HO in a non-contact method, and may process multiple complicated and fine holes HO.

FIGS. 2, 3, 4 and 5 are views for illustrating a display device 1 including the circuit board CB1 of FIG. 1.

Figure 2:
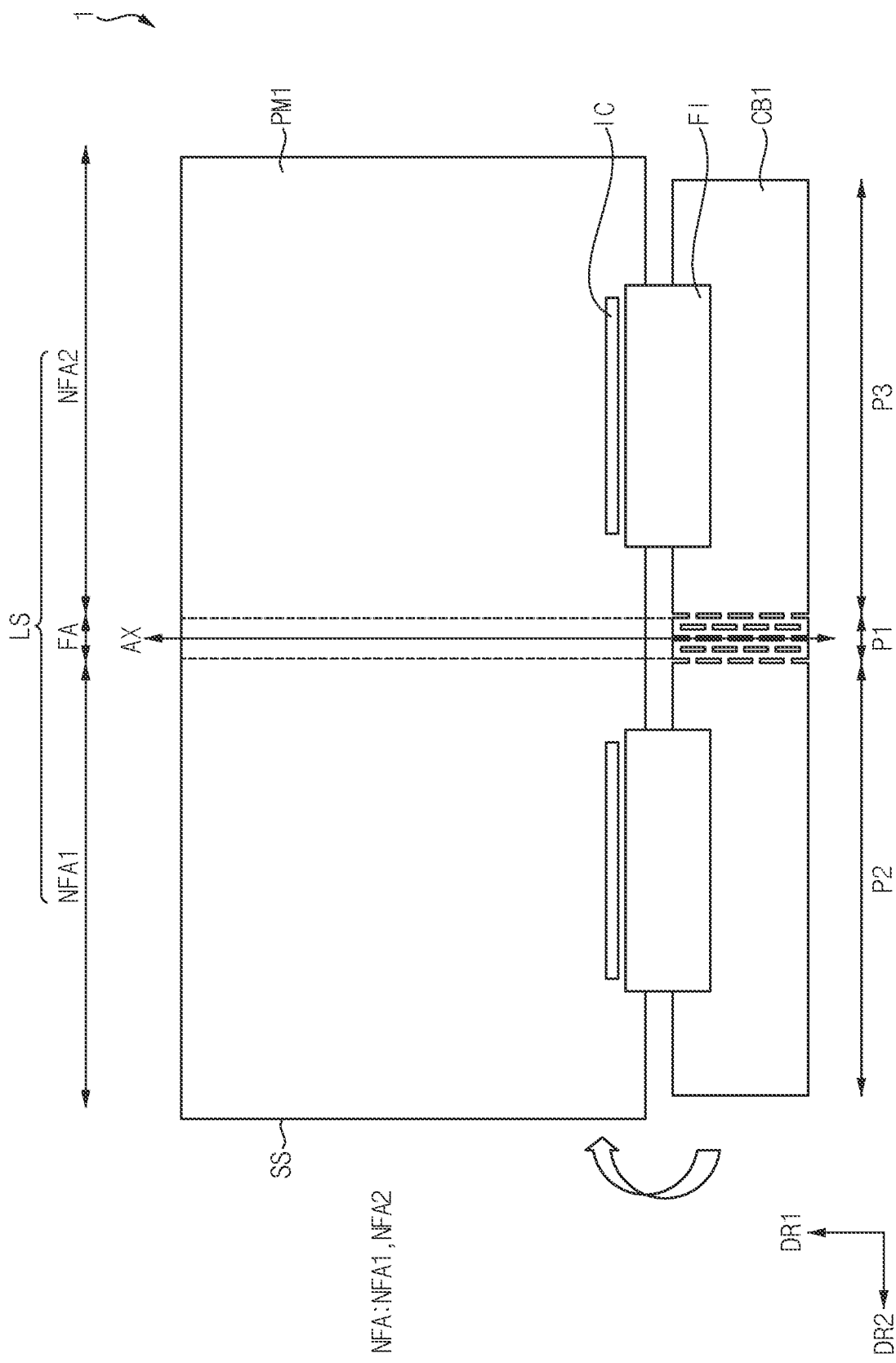
FIGS. 2, 3, 4 and 5 are views for illustrating a display device including the circuit board of FIG. 1.
Figure 3:
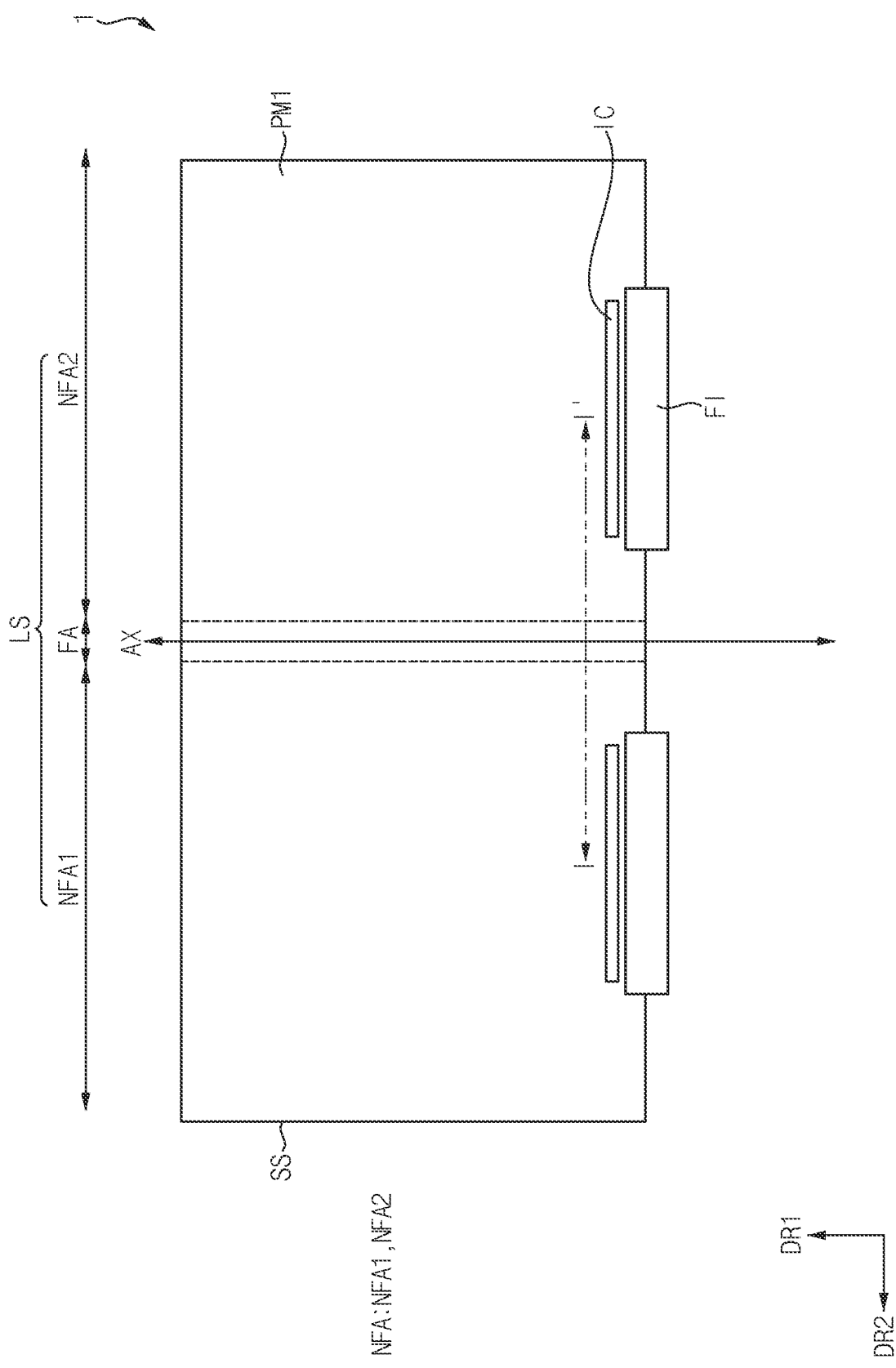
Figure 4:
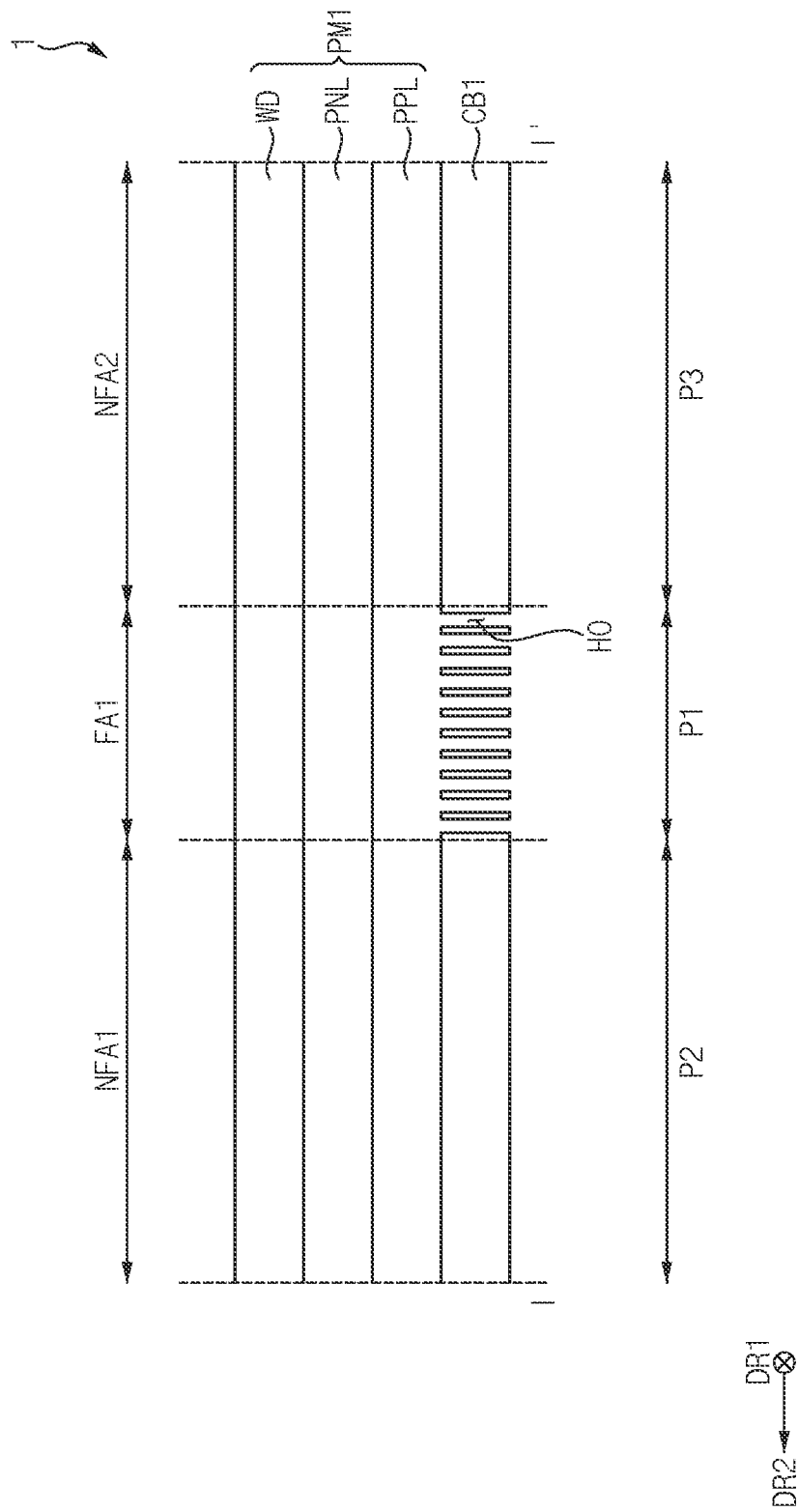
Figure 5:
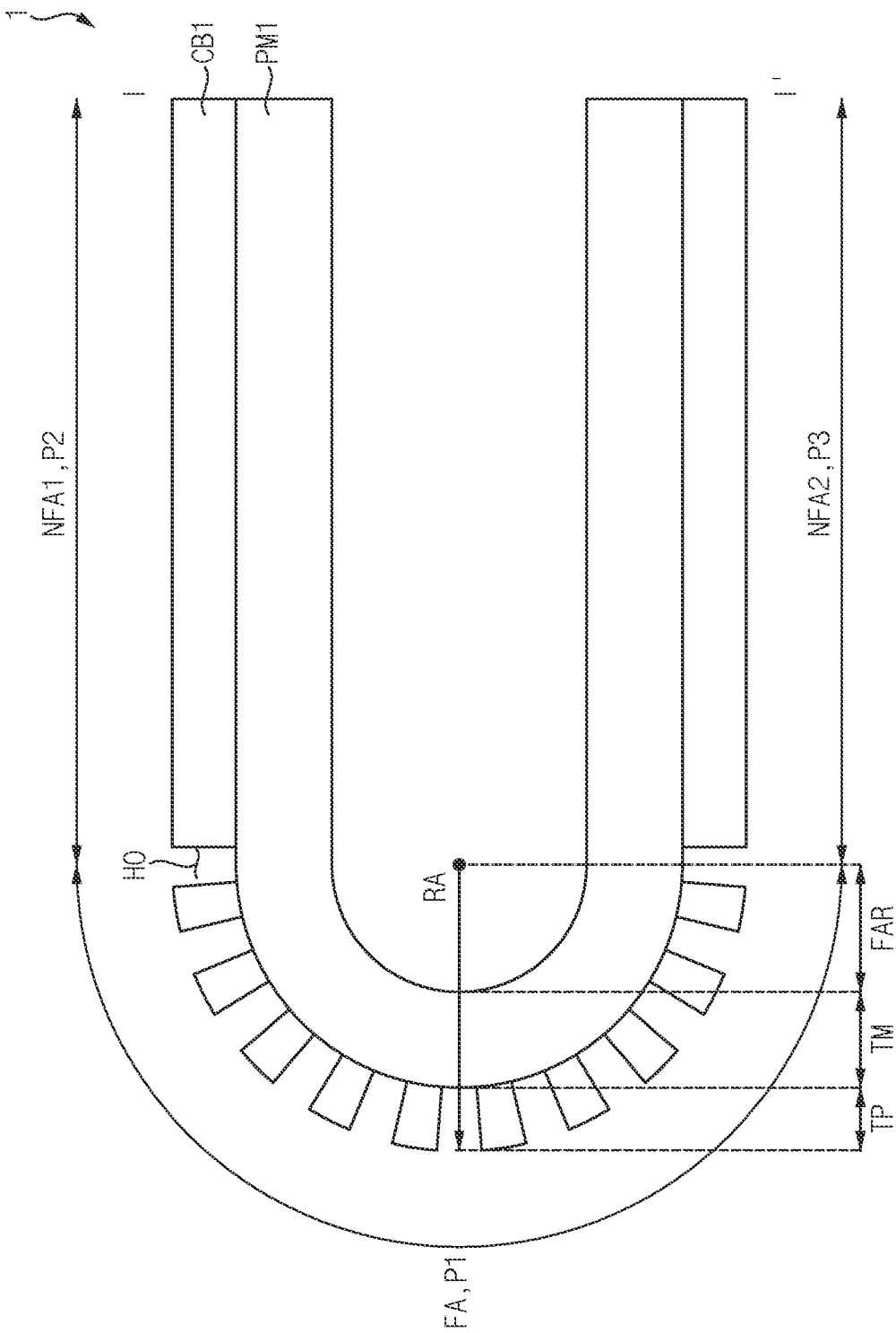

For example, FIG. 2 is a plan view illustrating the display device 1 according to an embodiment of the disclosure. FIG. 3 is a plan view illustrating a bent state of the film FI included in the display device 1 of FIG. 2. FIG. 4 is a schematic cross-sectional view taken along line I-I' of FIG. 3. FIG. 5 is a schematic cross-sectional view illustrating a folded state of the display device 1 of FIG. 3. In FIG. 5, the film FI is omitted for convenience of description.

Referring to FIGS. 2, 3, 4 and 5, the display device 1 according to an embodiment of the disclosure may include a display module PM1, the circuit board CB1, a driving chip IC, and a film FI. The circuit board CB1 included in the display device 1 of FIGS. 2, 3, 4, and 5 may have substantially the same configuration as the circuit board CB1 described above with reference to FIG. 1. Therefore, the description of the circuit board CB1 will be omitted or simplified below.

Referring to FIG. 2, in a plan view, the display module PM1 may include a folding area FA and non-folding areas NFA. A plane may be defined by the first direction DR1 and the second direction DR2.

The folding area FA may be foldable with respect to the folding axis AX extending in the first direction DR1.

The non-folding areas NFA may include a first non-folding area NFA1 and a second non-folding area NFA2. In an embodiment, each of the first non-folding area NFA1 and the second non-folding area NFA2 may be positioned adjacent to each other with the folding area FA interposed between the first non-folding area NFA1 and the second non-folding area NFA2. For example, in the opposite direction of the second direction DR2, the first non-folding area NFA1, the folding area FA, and the second non-folding area NFA2 may be sequentially positioned.

Referring to FIGS. 2 and 3, the driving chip IC may be disposed on the display module PM1. The driving chip IC may include a timing controller for driving the display panel, and the like.

In an embodiment, the circuit board CB1 may be connected to the display module PM1. For example, the circuit board CB1 and the display module PM1 may be connected in a chip on film (COF) method. The display device 1 may further include the film FI. For example, a first end of the film FI may be connected to the display module PM1 and a second end different from the first end of the film FI may be connected to the circuit board CB1.

In an embodiment, the display module PM1 may include a long side LS and a short side SS in a plan view. A plane may be defined by the first direction DR1 and the second direction DR2. The short side SS may be parallel to the first direction DR1. The long side LS may intersect the short side SS. In other words, the long side LS may be parallel to the second direction DR2.

In an embodiment, the circuit board CB1 may be disposed adjacent to a long side LS of the display module PM1 in a plan view. However, the disclosure is not limited thereto, and the circuit board CB1 may be disposed adjacent to a short side SS of the display module PM1 in a plan view. A detailed description of an arrangement of the circuit board CB1 adjacent to the long side LS of the display module PM1 will be described below with reference to FIG. 6.

In FIGS. 2 and 3, the circuit board CB1 and the display module PM1 may be connected each other in the COP method. However, the disclosure is not limited thereto. For example, in case that the circuit board CB1 is a flexible printed circuit board, the film FI may be omitted from the display device 1. In other words, the circuit board CB1 may be connected (e.g., directly connected) to the display module PM1.

Referring to FIG. 4, the display module PM1 may be disposed on the circuit board CB1. The display module PM1 may include a display panel PNL, a panel protection layer PPL, and a cover window WD.

The display panel PNL may include a light emitting device disposed on a substrate. Light emitted from the light emitting device may be combined and displayed as an image.

For example, the substrate may have rigid property. For example, the substrate may include a glass. In another example, the substrate may have flexible property. For example, the substrate may include polyimide or the like. However, the disclosure is not limited thereto. The substrate may include various materials.

For example, the light emitting device may include an organic light emitting diode (OLED). However, the disclosure is not limited thereto. The light emitting device may include various materials such as quantum dots, inorganic materials, and mixtures of organic and inorganic materials.

The panel protection layer PPL may be disposed under the display panel PNL. Accordingly, the display panel PNL may be protected from an external force applied from a rear (or lower) surface of the display panel PNL. For example, the panel protection layer PPL may include polyurethane (PU) or the like. However, the disclosure is not limited thereto, and the panel protection layer PPL may be used without limitation as long as a material may absorb and alleviate the external force.

The cover window WD may be disposed on the display panel PNL. Accordingly, the display panel PNL may be protected from the external force applied from a front (or upper) surface of the display panel PNL. For example, the cover window WD may include ultra-thin glass (UTG), transparent polyimide, or the like. However, the disclosure is not limited thereto, and the cover window WD may be used without limitation as long as a material may have a hardness capable of protecting the display panel PNL and be transparent.

Referring FIGS. 4 and 5, the first portion P1 of the base substrate SUB may overlap the folding area FA of the display module PM1, the second portion P2 of the base substrate SUB may overlap the first non-folding area NFA1 of the display module PM1, and the third portion P3 of the base substrate SUB may overlap the second non-folding area NFA2 of the display module PM1 in a thickness direction of the base substrate SUB.

As described above, the holes HO may be defined in the first portion P1 on the base substrate SUB. Accordingly, the first portion P1 of the base substrate SUB may be foldable with respect to the folding axis AX extending in the first direction DR1. In other words, in case that the folding area FA of the display module PM1 is folded with respect to the folding axis AX, the first portion P1 of the base substrate SUB may also be folded.

As described above, the size of the first portion P1 of the base substrate SUB, the number and size of the holes HO defined in the first portion P1, and the minimum gap L2 between the holes HO and the like may be freely modified as needed. For example, an outermost radius RA of the first portion P1 of the base substrate SUB may be equal to a sum of a folding radius FAR of the display module PM1, a thickness TM of the display module PM1, and a thickness TP of the circuit board CB. The outermost radius RA of the first portion P1 of the base substrate SUB may be formed to be less than or equal to about 4 mm.

In FIG. 5, the display device 1 may include the display module PM1 and the circuit board CB1. However, the disclosure is not limited thereto. Additional components may be further disposed between the display module PM1 and the circuit board CB1, and the outermost radius RA of the first portion P1 of the base substrate SUB may be equal to a sum of a thickness of the additional components, the folding radius FAR of the display module PM1, the thickness TM of the display module PM1, and the thickness TP of the circuit board CB.

Figure 6:
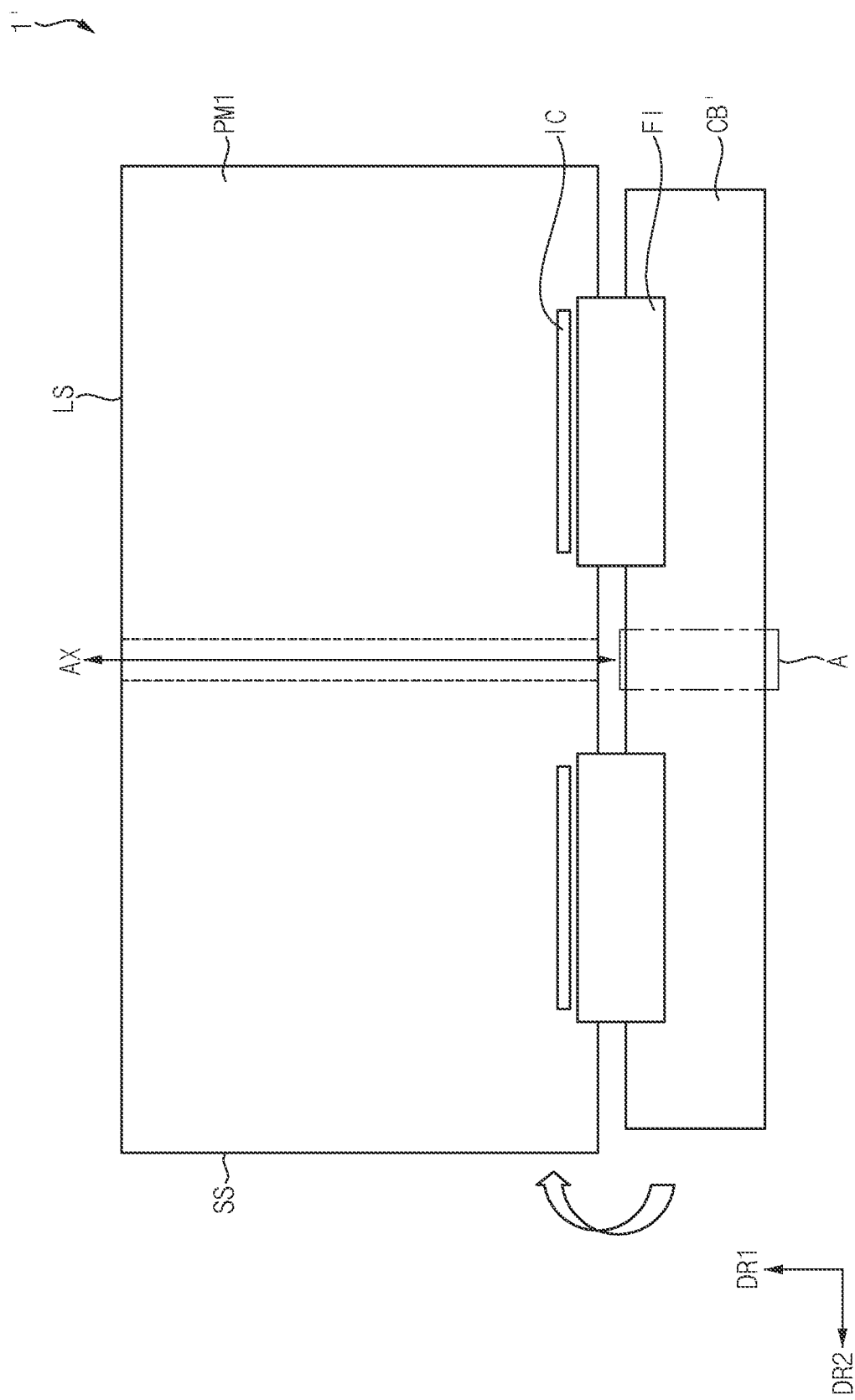
FIG. 6 is a plan view of a display device according to a comparative embodiment.

FIG. 6 is a plan view of a display device 1' according to a comparative embodiment.

Referring to FIG. 6, the display device 1' according to the comparative embodiment may also include the display module PM1, a circuit board CB', the driving chip IC, and the film FI. The display device 1' according to the comparative embodiment may differ only in a structure of the circuit board CB' from the display device 1 according to an embodiment of the disclosure described above with reference to FIGS. 1, 2, 3, 4 and 5. Hereinafter, descriptions overlapping those of the display device 1 will be omitted or simplified below.

In the circuit board CB' according to the comparative embodiment, the holes HO may not be defined. Accordingly, an area A of the circuit board CB' according to the comparative embodiment might not be folded unlike the circuit board according to an embodiment of the disclosure (e.g., the circuit board CB1 of FIG. 1).

The circuit board CB' according to the comparative embodiment may be disposed adjacent to a long side LS of the display module PM1. The area A of the circuit board CB' according to the comparative embodiment may overlap the folding area of the display module PM1 (e.g., the folding area FA of FIG. 2) in a thickness direction. Portions extending in the second direction DR2 or in the opposite direction of the second direction DR2 with the area A interposed therebetween may overlap the non-folding areas (e.g., the non-folding areas NFA of FIG. 2) in the thickness direction. In case that the folding area FA of the display module PM1 is folded with respect to the folding axis AX, the circuit board CB' according to the comparative embodiment may not be folded together. Accordingly, the disconnection of the lines included in the circuit board CB' may occur.

Restrictions may occur in case that the circuit board CB' included in the display device 1' according to the comparative embodiment is connected to the display module PM1. For example, the circuit board CB' may be disposed only adjacent to the short side SS of the display module PM1 in a plan view. In case that the circuit board CB' is disposed adjacent to the short side SS of the display module PM1, the number of scan lines may increase compared to the embodiment where the circuit board CB' is disposed adjacent to the long side LS of the display module PM1. The scan line may be a line connected to the pixels disposed parallel to the first direction DR1. As the number of scan lines increases, data charging time decreases, thus making driving the display device 1' at a high speed difficult.

On the other hand, referring again to FIGS. 1, 2, 3, 4, and 5, the circuit board CB1 according to an embodiment of the disclosure may include the base substrate SUB and the lines LI. As the holes HO are defined in the first portion P1 on the base substrate SUB, the first portion P1 of the base substrate SUB may be foldable with respect to the folding axis AX extending in the first direction DR1. Accordingly, in case that the display device 1 including the circuit board CB1 is folded, the circuit board CB1 may also be folded.

The lines LI included in the circuit board CB1 according to an embodiment of the disclosure may be disposed on the base substrate SUB. The lines LI may be spaced apart from each other in a plan view with the holes HO defined in the first portion P1 on the base substrate SUB, and the width L1 of the lines LI1 disposed in the first portion P1 on the base substrate SUB may be less than the minimum gap L2 between adjacent holes HO. Accordingly, the disconnection due to the holes HO may be prevented.

Among the lines LI included in the circuit board CB1 according to an embodiment of the disclosure, the line LI1 positioned in the first portion P1 on the base substrate SUB may contact with each other at the intersection points CR. Accordingly, in case that the first portion P1 is folded, the disconnection of the line LI1 positioned in the first portion P1 may be prevented.

In case that the circuit board CB1 included in the display device 1 according to an embodiment of the disclosure is connected to the display module PM1, the restrictions may be reduced or prevented. The circuit board CB1 may be disposed adjacent to a short side SS or a long side LS of the display module PM1. For example, the circuit board CB1 may be disposed adjacent to a long side LS of the display module PM1.

The number of scan lines may be reduced compared to the comparative embodiment where the circuit board CB1 is disposed adjacent to a short side SS of the display module PM1. The scan line may be a line connected to the pixels disposed parallel to the first direction DR1. As the number of scan lines decreases, the data charging time increases, thus readily driving the display device 1 at the high speed.

Figure 7:
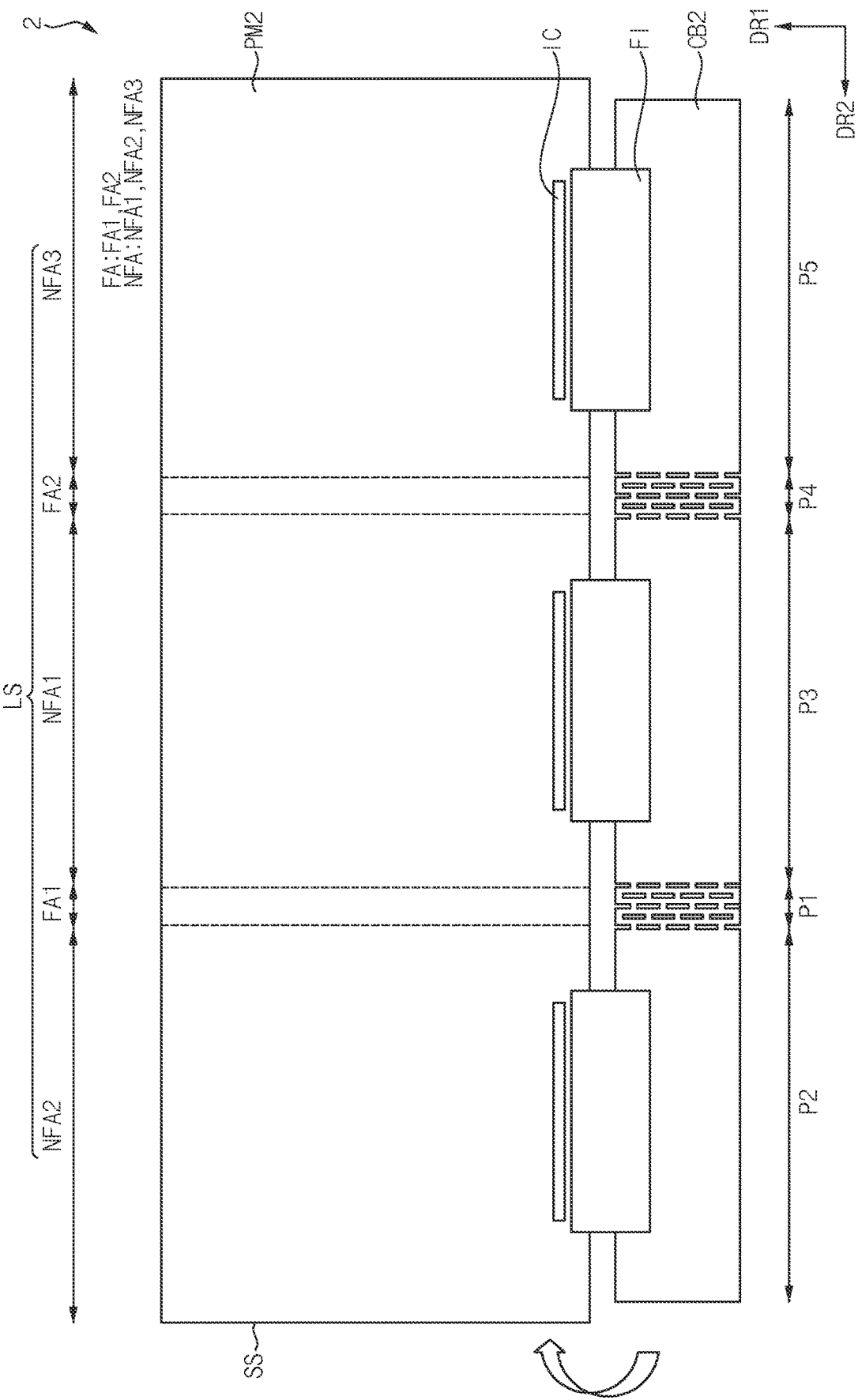
FIG. 7 is a plan view of the display device according to another embodiment of the disclosure.

FIG. 7 is a plan view of a display device 2 according to another embodiment of the disclosure.

Referring to FIGS. 1, 2, 3, 4, 5, 6, and 7, the display device 2 according to another embodiment of the disclosure may include a display module PM2, a circuit board CB2, a driving chip IC, and a film FI. The display device 2 of FIG. 7 may differ only in each shape of the display module PM2 and the circuit board CB2 compared to the circuit board CB1 and the display device 1 including the circuit board CB1 described above with reference to FIGS. 1, 2, 3, 4, 5, and 6. So, hereinafter, each shape of the display module PM2 and the circuit board CB2 will be described, and overlapping descriptions will be omitted or simplified below.

Referring to FIG. 7, in a plan view, the display module PM2 may include folding areas FA and the non-folding areas NFA. A plane may be defined by the first direction DR1 and the second direction DR2.

The folding areas FA may include a first folding area FA1 and a second folding area FA2. In an embodiment, the second folding area FA2 may be spaced apart from the first folding area FA1. Each of the first folding area FA1 and the second folding area FA2 may be foldable with respect to the folding axis AX extending in the first direction DR1.

The non-folding areas NFA may include a first non-folding area NFA1, a second non-folding area NFA2, and a third non-folding area NFA3. In an embodiment, each of the first non-folding area NFA1 and the second non-folding area NFA2 may be positioned adjacent to each other with the first folding area FA1 interposed between the first non-folding area NFA1 and the second non-folding area NFA2, and each of the second non-folding area NFA2, and the third non-folding area NFA3 may be positioned adjacent to each other with the second folding area FA2 interposed between the second non-folding area NFA2, and the third non-folding area NFA3. For example, in the opposite direction of the second direction DR2, the first non-folding area NFA1, the first folding area FA1, the second non-folding area NFA2, the second folding area FA2, and the third non-folding area NFA3 may be sequentially positioned.

The circuit board CB2 may include a base substrate (e.g., the base substrate SUB of FIG. 1) and multiple lines (e.g., the lines LI of FIG. 1).

In an embodiment, the base substrate may include a first portion P1, a second portion P2, a third portion P3, a fourth portion P4, and a fifth portion P5.

The first portion P1 may extend in the first direction DR1. The second portion P2 may extend from the first portion P1 in the second direction DR2 intersecting the first direction DR1. The third portion P3 may extend from the first portion P1 in the opposite direction of the second direction DR2. The fourth portion P4 may be spaced apart from the first portion P1, and may be disposed adjacent to the third portion P3. The fifth portion P5 may be spaced apart from the third portion P3, and may be disposed adjacent to the fourth portion P4.

In an embodiment, in case that the circuit board CB2 is bent, the first portion P1 of the base substrate SUB may overlap the first folding area FA1 of the display module PM2, the second portion P2 may overlap the second non-folding area NFA2, the third portion P3 may overlap the first non-folding area NFA1, the fourth portion P4 may overlap the second folding area FA2, and the fifth portion P5 may overlap the third non-folding area NFA3 in a thickness direction of the base substrate SUB.

In an embodiment, multiple holes HO may be defined in each of the first portion P1 and the fourth portion P4 on the base substrate SUB. For example, as the holes HO are defined in the first portion P1 on the base substrate SUB, the first portion P1 of the base substrate SUB may be foldable with respect to a folding axis AX. As the holes HO are defined in the fourth portion P4 on the base substrate SUB, the fourth portion P4 of the base substrate SUB may be foldable with respect to a folding axis AX. Folding axes AX may extend in the first direction DR1.

As described above with reference to FIG. 1, the lines LI may be spaced apart from the holes HO defined in each of the first portion P1 and the fourth portion P4 on the base substrate SUB in a plan view. The width (or thickness) L1 of the line LI1 positioned in the first portion P1 on the base substrate SUB may be less than the minimum gap L2 between adjacent holes HO in the first direction DR1. A width (or thickness) L1 of the line positioned in the fourth portion P4 on the base substrate SUB may be less than the minimum gap L2 between adjacent holes HO in the first direction DR1.

In an embodiment, the lines LI1 positioned in the first portion P1 on the base substrate SUB may contact each other at the intersection points CR. Lines positioned in the fourth portion P4 on the base substrate SUB may contact each other at the intersection points CR. Accordingly, in case that the first portion P1 of the base substrate SUB is folded, the disconnection of the line LI1 positioned in the first portion P1 may be prevented, and in case that the fourth portion P4 of the base substrate SUB is folded, the disconnection of the line positioned in the fourth portion P4 on the base substrate SUB may also be prevented.

In an embodiment, the circuit board CB2 may be connected to the display module PM2. For example, the circuit board CB2 and the display module PM2 may be connected in a chip on film (COF) method.

In an embodiment, the display module PM2 may include a long side LS and a short side SS in a plan view. A plane may be defined by the first direction DR1 and the second direction DR2. The short side SS may be parallel to the first direction DR1. The long side LS may intersect the short side SS. In other words, the long side LS may be parallel to the second direction DR2.

In an embodiment, the circuit board CB2 may be disposed adjacent to a long side LS of the display module PM2 in a plan view. However, the disclosure is not limited thereto, and the circuit board CB2 may be disposed adjacent to a short side SS of the display module PM2 in a plan view. A detailed description of an arrangement of the circuit board CB2 disposed adjacent to a long side LS of the display module PM1 is similar to that described above with reference to FIG. 6.

Figure 8:
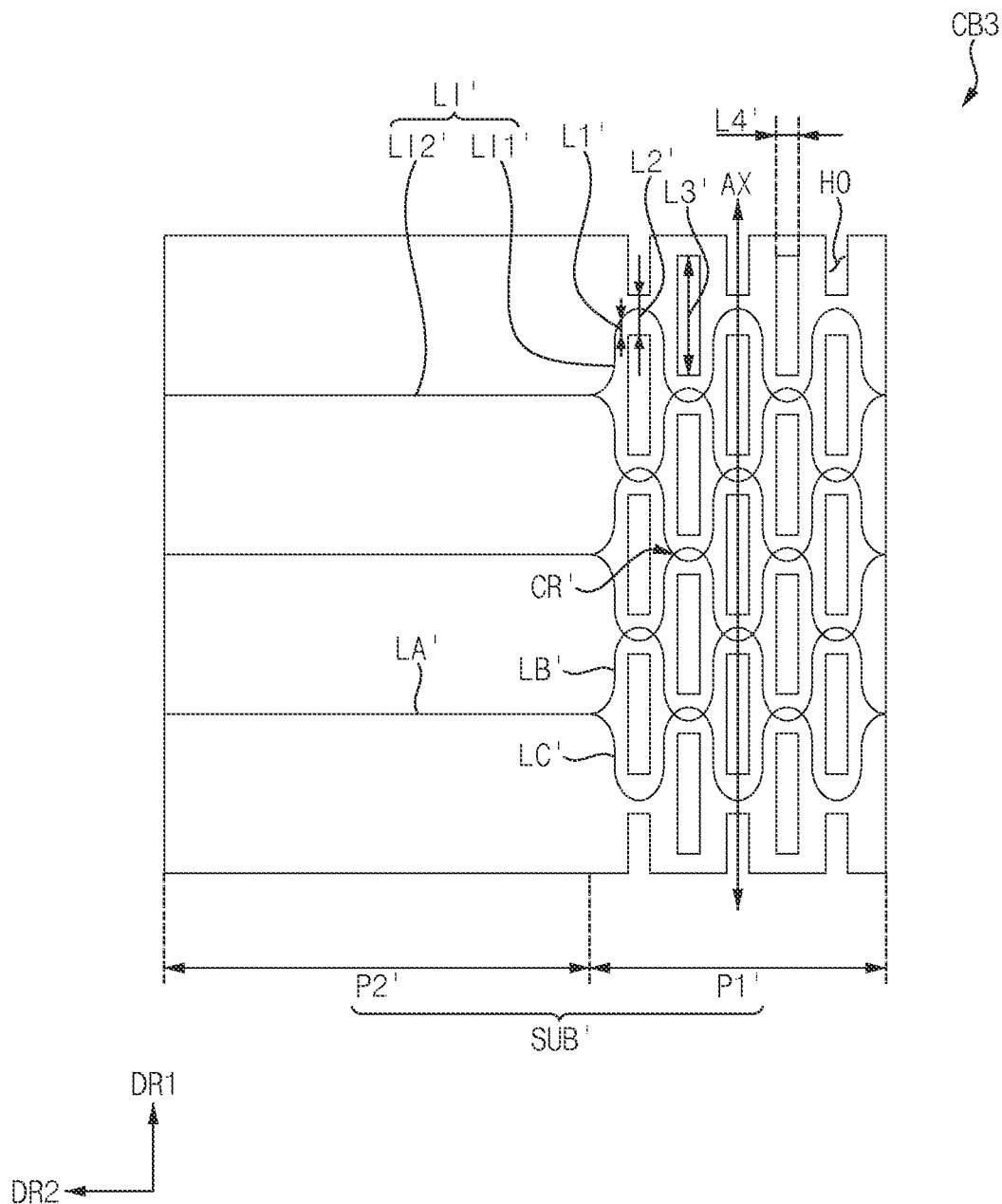
FIG. 8 is a plan view illustrating a circuit board according to still another embodiment of the disclosure.
Figure 9:
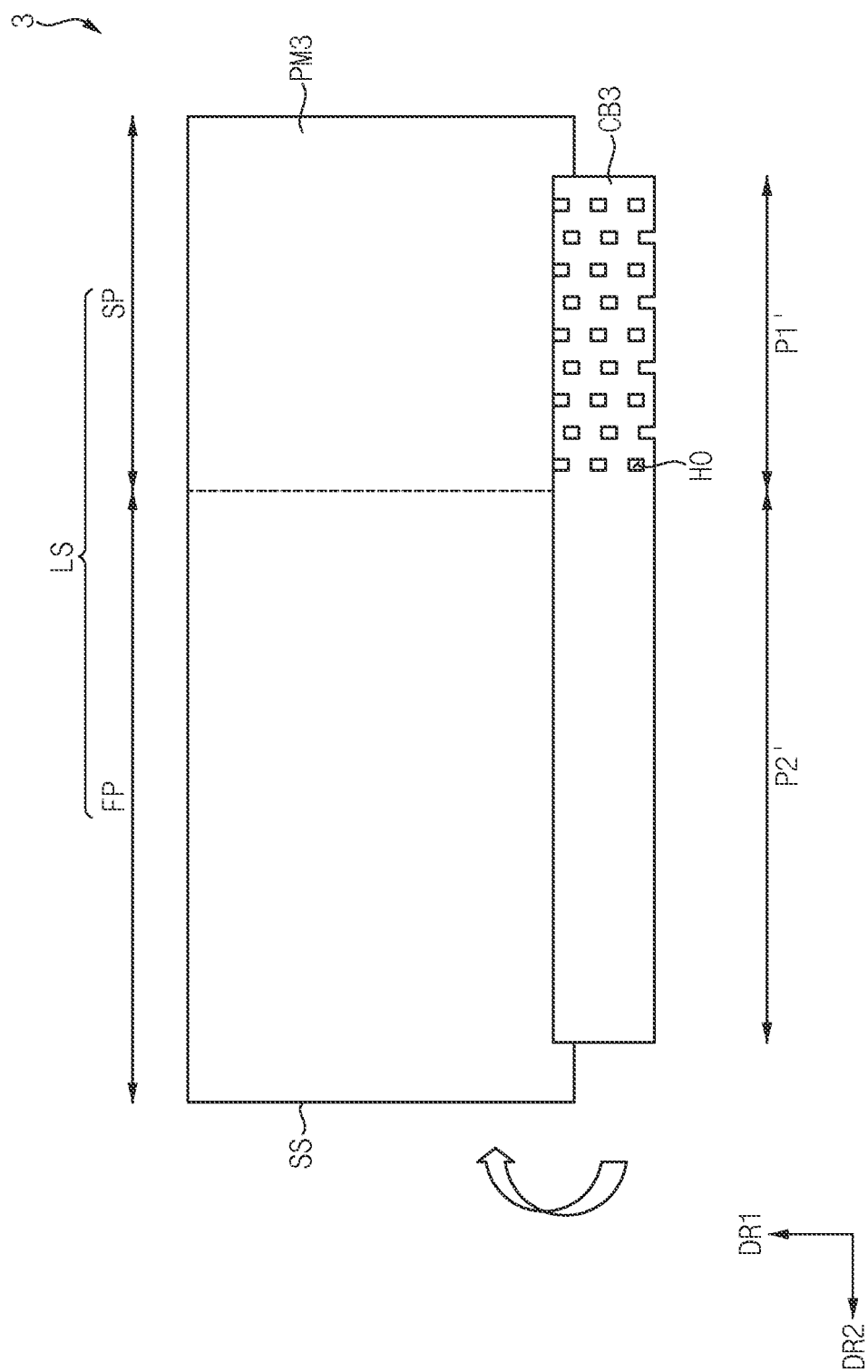
Figure 10:
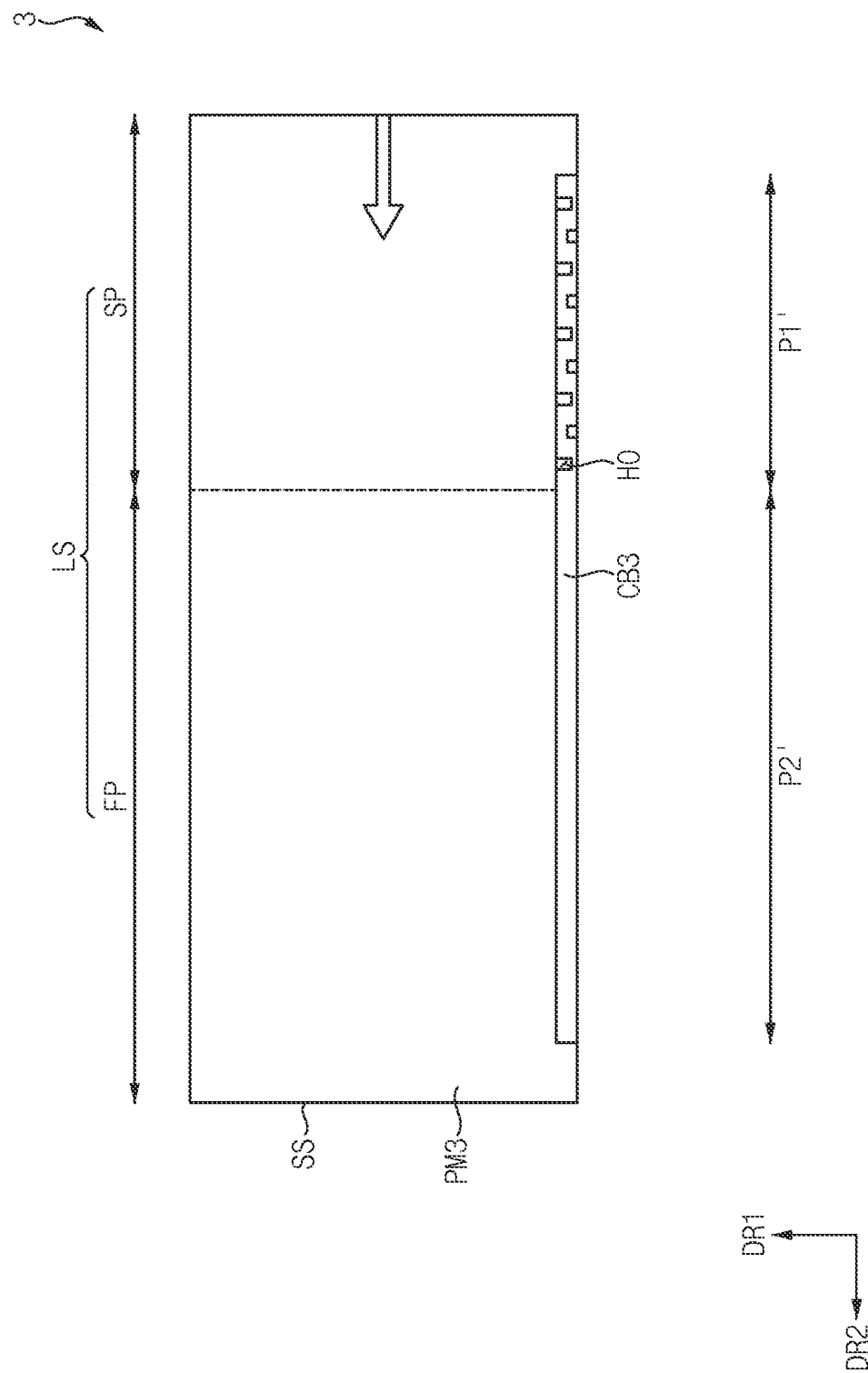

FIG. 8 is a plan view illustrating a circuit board CB3 according to still another embodiment of the disclosure. FIGS. 9, 10, and 11 are views illustrating a display device 3 including the circuit board of FIG. 8.

For example, FIG. 9 is a plan view illustrating the display device 3 according to still another embodiment of the disclosure. FIG. 10 is a plan view illustrating a bent state of the film FI included in the display device 3 of FIG. 9. FIG. 11 is a plan view illustrating a sliding state of a sliding portion SP of a display module PM3 included in the display device 3 of FIG. 9.

Referring to FIGS. 8, 9, 10, and 11, the display device 3 according to still another embodiment of the disclosure may include a display module PM3 and a circuit board CB3. The display device 3 of FIG. 11 may differ only in each shape of the display module PM3 and the circuit board CB3 included compared to the display devices 1 described above with reference to FIGS. 1, 2, 3, 4, 5, 6, 7, and 8. So, hereinafter, each shape of the display module PM3 and the circuit board CB3 will be described, and overlapping descriptions will be omitted or simplified below.

Referring to FIG. 8, the circuit board CB3 according to still another embodiment of the disclosure may include a base substrate SUB' and multiple lines LI'.

In an embodiment, the base substrate SUB' may include a first portion P1', and a second portion P2'. The first portion P1' may extend in the first direction DR1. The second portion P2' may extend from the first portion P1' in the second direction DR2 intersecting the first direction DR1.

In an embodiment, multiple holes HO may be defined in the first portion P1' on the base substrate SUB'. For example, as the holes HO are defined in the first portion P1' on the base substrate SUB', the first portion P1' of the base substrate SUB may have a curvature.

The holes HO defined in the first portion P1 on the base substrate SUB may be have a same size in a plan view. For example, each of the holes HO may have a first length L3' in the first direction DR1 and may have a second length L4' in the second direction DR2.

The lines LI' may be disposed on the base substrate SUB'. The lines LI' may be spaced apart from the holes HO defined in the first portion P1' on the base substrate SUB' in a plan view. A plane may be defined by the first direction DR1 and the second direction DR2.

The lines LI' may include a line LI1' positioned in the first portion P1' and a line LI2' positioned in the second portion P2' on the base substrate SUB'. A width-Width (or thickness) L1' of the line LI1' positioned in the first portion P1' and a width (or thickness) of the line LI2' positioned in the second and third portions P2' may be different from each other.

In an embodiment, the width (or thickness) L1' of the line LI1' positioned in the first portion P1' on the base substrate SUB' may be less than a minimum gap L2' between adjacent holes HO in the first direction DR1. For example, the holes HO may be defined in the first portion P1' on the base substrate SUB' to have a first gap in the first direction DR1. The holes HO may be defined in the first portion P1' on the base substrate SUB' to have a second gap in the second direction DR2. The first gap and the second gap may be the same. However, the disclosure is not limited thereto.

The width L1' of the line LI1' positioned in the first portion P1' on the base substrate SUB' may be less than the minimum gap L2' among the gaps between adjacent holes HO. Accordingly, disconnection of the line LI1' due to the holes HO may be prevented. However, the disclosure is not limited thereto, and the line LI1' positioned in the first portion P1' and the line LI2' positioned in the second portion P2' on the base substrate SUB' may have a same width.

The line LI1' positioned in the first portion P1' and the line LI2' positioned in the second portion P2' on the base substrate SUB' may have different shapes in a plan view.

In an embodiment, the lines LI1' positioned in the first portion P1' on the base substrate SUB' may contact each other at multiple intersection points CR'. For example, at a boundary between the first portion P1' and the second portion P2' on the base substrate SUB', the line LI2' positioned in the second portion P2' may be branched. The branched lines may have a spider web shape in the first portion P1' in a plan view. In other words, the branched lines may intersect each other and may contact each other at the intersection points CR'. The branched lines positioned in the first portion P1' may be combined again in a third portion. The third portion may be defined as a portion extending from the first portion P1' in the opposite direction of the second direction DR2.

The lines LI1' positioned in the first portion P1' on the base substrate SUB' may be disposed to contact each other at the intersection points CR', so that in case that the first portion P1' has a curvature, the disconnection of the line LI1' positioned in the first portion P1' may be prevented.

However, the disclosure is not limited thereto, and the size of the first portion P1', the number and size of the holes HO defined in the first portion P1', the minimum gap L2' between adjacent holes HO, and the like may be freely modified as needed.

Referring to FIGS. 8, 9, 10, and 11, in a plan view, the display module PM3 may include a fixed portion FP and a sliding portion SP. A plane may be defined by the first direction DR1 and the second direction DR2. The sliding portion SP may extend in the opposite direction of the second direction DR2 from the fixed portion FP and may have a curvature after sliding. For example, the sliding portion SP may be slidable. The sliding portion SP may be rolled as the display module PM3 slides.

In an embodiment, the circuit board CB3 may be connected to the display module PM3. For example, the circuit board CB3 may be a flexible printed circuit board (FPCB). Accordingly, the circuit board CB may be connected (e.g., directly connected) to the display module PM3.

In an embodiment, the circuit board CB3 may be disposed adjacent to a long side LS of the display module PM3. However, the disclosure is not limited thereto, and the circuit board CB3 may be disposed adjacent to a short side SS of the display module PM3. A detailed description of an arrangement of the circuit board CB3 disposed adjacent to a long side LS of the display module PM1 is similar to that described above with reference to FIG. 6.

In an embodiment, the first portion P1' of the base substrate SUB' may overlap the sliding portion SP of the display module PM3 in a thickness direction of the base substrate SUB'. As described above, the holes HO may be defined in the first portion P1' of the base substrate SUB'. Accordingly, the first portion P1' of the base substrate SUB' may have a curvature. In other words, in case that the sliding portion SP of the display module PM3 has a curvature while sliding, the first portion P1' of the base substrate SUB' may also have a curvature while sliding.

In summary, the circuit board CB1, CB2, or CB3 according to embodiments of the disclosure may include a base substrate SUB or SUB' and multiple lines LI or LI'. As multiple holes HO are defined in the first portion P1 or P1' of the base substrate SUB or SUB', in case that the display device 1, 2, or 3 including the circuit board CB1, CB2, or CB3 is bent, the circuit board CB1, CB2 or CB3 may also be bent together.

The lines LI or LI' included in the circuit board CB1, CB2, or CB3 may be disposed on the base substrate SUB or SUB'. The lines LI or LI' may be spaced apart from the holes HO defined in the first portion P1 or P1' on the base substrate SUB or SUB'. The width L1 or L1' of each of the lines LI1 or LI1' positioned in the first portion P1 or P1' may be less than a minimum gap L2 or L2' between adjacent holes HO. Accordingly, disconnection of each lines LI1 or LI1' due to the holes HO may be prevented.

Among the lines LI or LI' included in the circuit board CB1, CB2, or CB3, the lines LI or LI' positioned in the first portion P1 or P1' may be disposed in contact with each other at the intersection points CR or CR'. Accordingly, disconnection of the lines LI or LI' positioned in the first portion P1 or P1' may be prevented in case that the first portion P1 or P1' is folded.

Restrictions may be reduced or prevented in case that the circuit board CB1, CB2, or CB3 included in the display device 1, 2, or 3 according to embodiments of the disclosure is connected to the display module PM1, PM2, PM3. For example, the circuit board CB1, CB2, or CB3 may be disposed adjacent to a short side SS or a long side LS of the display module PM1, PM2, or PM3. In case that the circuit board CB1, CB2, or CB3 is disposed adjacent to a long side LS of the display module PM1, PM2, or PM3, the number of scan lines may be reduced compared to the embodiment where the circuit board CB1, CB2, or CB3 is disposed adjacent to a short side SS of the display module PM1, PM2, or PM3. The scan line may be a line connected to the pixels disposed parallel to the first direction DR1. As the number of scan lines decreases, data charging time increases, thus readily driving the display device 1, 2, or 3 at the high speed.

The circuit board and the display device including the circuit board according to the embodiments may be applied to a display device included in a computer, a notebook, a mobile phone, a smartphone, a smart pad, a PMP, a PDA, an MP3 player, or the like.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A circuit board comprising:
  a base substrate including:
    a first portion extending in a first direction and including a plurality of holes; and
    a second portion extending from the first portion in a second direction intersecting the first direction; and
  at least one line disposed on the base substrate, the at least one line having a recombinant branch structure including a plurality of branch line portions extending between adjacent holes among the plurality of holes,
  wherein at least two conductive traces among the plurality of branch line portions are spaced apart from each other between adjoining ones of the plurality of holes in a view in a third direction perpendicular to both the first direction and the second direction.

2. The circuit board of claim 1, wherein the base substrate further includes a third portion extending from the first portion in an opposite direction of the second direction.

3. The circuit board of claim 2, wherein the first portion is foldable with respect to a folding axis extending in the first direction.

4. The circuit board of claim 1, wherein
  the at least one line is among a plurality of lines disposed on the base substrate, each of the plurality of lines having a corresponding recombinant branch structure including:
    a first main line portion disposed on the second portion of the base substrate;
    a plurality of branch line portions branching from a distal end portion of the first main line portion and extending between adjacent holes among the plurality of holes; and
    a second main line portion, the plurality of branch line portions recombining at a proximal end portion of the second main line portion, and each of the plurality of lines is spaced apart from the plurality of holes in the view in the third direction.

5. The circuit board of claim 4, wherein a thickness of each of the plurality of lines in the first direction is less than a minimum gap between adjacent holes of the pluralities of holes.

6. The circuit board of claim 5, wherein at least some of the plurality of lines and/or at least some of the plurality of branch line portions intersect each other at a plurality of intersection points overlapping the first portion of the base substrate in the view.

7. A display device comprising:
a display module including:
a first folding area extending in a first direction;
a first non-folding area extending from the first folding area in a second direction intersecting the first direction; and
a second non-folding area extending from the first folding area in an opposite direction of the second direction; and
a circuit board electrically connected to the display module and including a base substrate and a line disposed on the base substrate, the base substrate including:
a first portion extending in the first direction and including a plurality of holes;
a second portion extending from the first portion in the second direction; and
a third portion extending from the first portion in the opposite direction of the second direction,
wherein the line includes:
a first main line portion disposed on the second portion; and
a plurality of branch line portions branching from a distal end part of the first main line portion, the plurality of branch line portions being disposed on the first portion and extending between adjacent holes among the plurality of holes.

8. The display device of claim 7, wherein the first portion of the base substrate overlaps the first folding area of the display module in a thickness direction of the base substrate.

9. The display device of claim 7, wherein the first portion of the base substrate is foldable with respect to a folding axis extending in the first direction.

10. The display device of claim 7, wherein
the line is among a plurality of lines disposed on the base substrate, each of the plurality of lines including a corresponding main line portion and a corresponding plurality of branch line portions, and
each of the plurality of lines is spaced apart from the plurality of holes in a view in a third direction perpendicular to both the first direction and the second direction.

11. The display device of claim 7, wherein the line further includes a second main line portion disposed on the third portion, the plurality of branch line portions recombining at a proximal end part of the second main line portion.

12. The display device of claim 11, wherein at least some of the plurality of branch line portions intersect each other at a plurality of intersection points in an area extending between the adjacent holes.

13. The display device of claim 7, wherein in a plan view,
the display module has a short side parallel to the first direction and a long side intersecting the short side, and
the circuit board is disposed adjacent to the long side of the display module.

14. The display device of claim 7, wherein,
the display module further includes a second folding area spaced apart from the first folding area and disposed adjacent to the first non-folding area,
the circuit board further includes a fourth portion spaced apart from the first portion and disposed adjacent to the third portion, and
the second folding area of the display module and the fourth portion of the circuit board overlap with each other in a thickness direction of the base substrate.

15. A display device comprising:
a display module including a fixed portion and a sliding portion extending in a direction from the fixed portion and rollable as the display module slides; and
a circuit board electrically connected to the display module, the circuit board including a base substrate and a plurality of lines on the base substrate, wherein
the base substrate includes:
a first portion extending in a first direction and including a plurality of holes; and
a second portion extending from the first portion in a second direction intersecting the first direction, and
at least some of the plurality of lines intersect each other between adjacent holes among the plurality of holes in a view in a third direction perpendicular to both the first direction and the second direction.

16. The display device of claim 15, wherein the first portion of the base substrate overlaps the sliding portion of the display module in the third direction.

17. The display device of claim 15, wherein
each of the plurality of lines includes a corresponding plurality of branch line portions branching from a respective main line portion, and
each of the plurality of lines is spaced apart from the plurality of holes in the view.

18. The display device of claim 17, wherein
adjacent lines among the plurality of lines intersect each other between corresponding first pairs of adjacent holes among the plurality of holes, and
the corresponding plurality of branch line portions intersect each other between a corresponding second pair of adjacent holes among the plurality of holes.

19. The display device of claim 18, wherein
the corresponding first pairs of adjacent holes are adjacent to each other in the first direction, and
the corresponding second pairs of adjacent holes are adjacent to each other in the second direction.

20. The display device of claim 15, wherein in the view,
the display module has a short side parallel to the first direction and a long side intersecting the short side, and
the circuit board is disposed adjacent to the long side of the display module.

* * * * *